United States Patent
Mathes

[11] 3,722,625
[45] Mar. 27, 1973

[54] LUBRICATING DEVICE FOR PNEUMATIC TOOLS

[76] Inventor: Alfred Mathes, Hauptstrasse 30, 6382 Friedrichsdorf, Germany

[22] Filed: Dec. 17, 1971

[21] Appl. No.: 209,258

[30] Foreign Application Priority Data

Dec. 22, 1970 Germany .................. P 20 63 157.6

[52] U.S. Cl. .............................. 184/55 A, 261/78 A
[51] Int. Cl. ............................................. F16n 7/34
[58] Field of Search ......... 184/55 R, 55 A, 7 D, 56 R, 184/56 A; 261/78 A

[56] References Cited

UNITED STATES PATENTS

| | | | |
|---|---|---|---|
| 3,129,788 | 4/1964 | Heckt | 184/55 R |
| 3,297,106 | 1/1967 | Hanson et al. | 184/55 A X |
| 3,581,845 | 6/1971 | Van Nederynen | 184/56 A X |
| 1,907,464 | 5/1933 | Terry | 184/55 A |
| 3,628,631 | 12/1971 | O'Leary | 184/55 A |

*Primary Examiner*—Manuel A. Antonakas
*Attorney*—Leonard H. King

[57] ABSTRACT

A lubricating device for pneumatic tools, in particular pulsating pneumatic tools such as pneumatic nail drivers and the like. The device consists of an oil pressure chamber surrounding an air pressure chamber through which latter chamber air under pressure is adapted to pass. The oil pressure chamber communicates with the air pressure chamber by means of a valve chamber and valve assembly with opening and closing of communication between the two chambers being controlled by air pressure differential, with communication between the two chambers being closed when the tool is not being operated and there is no air flow. The communication between the two chambers being open during air flow passage and means are provided to retard closing of the communication after cessation of air flow through the device to the tool.

7 Claims, 1 Drawing Figure

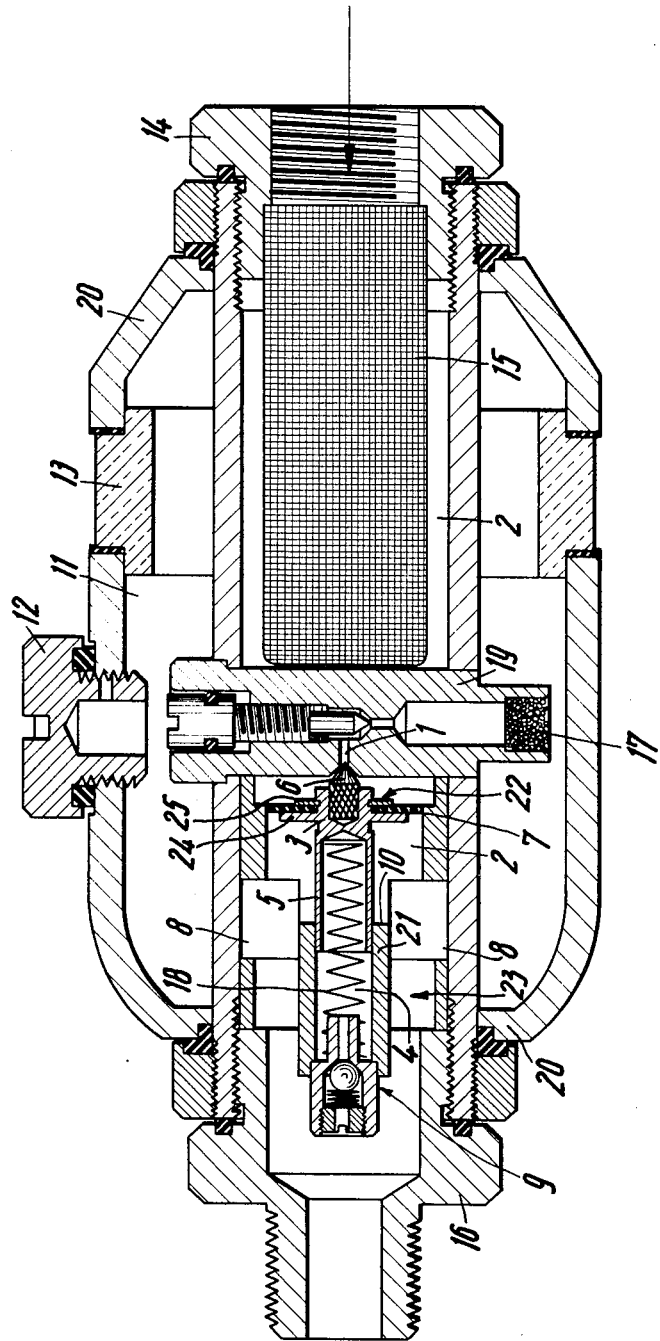

LUBRICATING DEVICE FOR PNEUMATIC TOOLS

The invention relates to a lubricating device or structure for pneumatic tools, in particular pulsating pneumatic tools, such as pneumatic nail drivers, and the like.

The device consists of an oil container including an oil pressure chamber which is installed between the tool and the compressed air supply hose and a compressed air chamber which passes through the device. A valve chamber intersects the compressed air chamber and has a mushroom type valve which is positioned coaxially in the compressed air chamber, with the valve operating in conjunction with the valve chamber and controllable by means of the pressure of the compressed air stream. The valve chamber has an orifice leading to the oil pressure chamber and which is controlled by a pressure regulating valve. The orifice constitutes an oil outlet opening which is aligned in the direction of the compressed air flow with the oil outlet opening being regulated by a portion of the shaft of the mushroom type valve and being closed when the tool is non-operative (at which time no compressed air is being fed to the tool) while the valve cap of the valve, when it is also in a rest position, almost completely blocks a narrowed cross-sectional area of the compressed air chamber and permits air pressure flow through the air pressure chamber when in its operating position.

The purpose of this inventive type of device is to provide a mist or spray of oil to the compressed air tools in order to lubricate parts of the tools.

In an already known lubricating device of this type (U.S. Pat. No. 2,984,316) the air pressure chamber is connected with the oil pressure chamber by means of a capillary drilled hole which is closed off by a flexible valve ring in such a way that the pressure which prevails in the air chamber builds up in the oil pressure chamber via the drilled hole. As a result of the compressed air being used up by operation of the tool the pressure in the air channel is reduced and when this happens excess pressure occurs in the oil chamber which excess pressure blows the oil into the compressed air chamber through a connecting line. This line is positioned in the air chamber and is normally held shut by a valve with the oil spray then being atomized in the compressed air stream and carried along to the tool in order to lubricate it. This known lubrication system requires that the compressed air intake be closed off in order to refill the oil in the pressure chamber as the oil pressure chamber is continually subjected to air pressure and as a result the oil would blow back out the filler hole. Furthermore it would be undesirable in this case to have to provide a check or non-return valve in order to be able to put the oil pressure chamber under pressure.

The object of this invention is to provide a lubricating device of the type described above and which makes possible the re-filling of the oil pressure chamber without having to shut off the compressed air supply, and which does not require a supplementary check valve in order to put the oil chamber back under pressure.

This object is achieved according to the invention by means of the fact that the spring loaded mushroom type valve is provided with a retarding device to return the valve to the almost closed position. This arrangement achieves the object of being able to refill the oil pressure chamber without having to shut off the compressed air supply and without requiring a supplementary check or non-return valve to be able to put the oil pressure chamber back under pressure.

Because the entrance of air into the oil pressure chamber and the exit of the oil out of this chamber occurs only via a connecting line from and to the air pressure channel, whose opening is held either open or closed according to the given operating conditions, it is, on the one hand, not possible for oil to reach the compressed air chamber or line when the tool is not operating and, on the other hand, it is possible to open the oil pressure chamber to re-fill it without it being necessary to negate pressure in the compressed air line, because the air pressure has no effect on the oil pressure chamber when the valve is closed.

The lubricating device is, in a preferred embodiment, so constructed that the valve cap of the mushroom type valve moves with small clearance within a casing which, in the area of the second half of the path of travel of the valve has openings to the compressed air line located in a position between the tool and the valve. This provides the advantage that the retarding device with the flow-through openings and the mushroom type valve can be fitted in the lubricating device as an easily replaceable unit.

The lubricating device can, at the same time, be advantageously constructed for favorably seating the mushroom type valve and a check valve in such a way that the valve carrier has, on the side toward the tool, a hollow shaft which moves within a cylinder in which there is provided a dampening aperture and including a spring-loaded check valve opening into the compressed air chamber.

The cylinder can with advantage be shaped so that its inward end forms a limiting stop for the valve cap. In addition, in the interests of developing a closed construction unit, it is advantageous to install a valve cone in the valve carrier on the side facing the incoming compressed air flow in order to close off the oiling openings.

The valve cap is preferably made from flexible material this providing the advantage of being able to quickly reduce the pressure in the attached tool.

Another advantage may also be in providing a path of movement for the valve shaft whereby the shaft receives a rotational movement during its longitudinal travel. This may be achieved in a simple manner by means of providing a helical groove in the valve cylinder to receive a cam on the valve shaft. However, other friction or braking elements could additionally also be provided to retard the return movement of the valve shaft.

The invention will now be described in greater detail with reference to the accompanying diagrammatic illustration of one embodiment of the invention.

In the drawing an orifice for oil out-flow or air inflow is designated at 1; a compressed air line at 2; a valve carrier of a mushroom type valve 23 is shown at 3; and the valve shaft cylinder which receives the section of the valve carrier 3 and which has been formed in the shape of a hollow shaft 5 is shown at 4, and a valve cone is shown at 6. In addition a valve cap 7 is positioned on the hollow shaft 5, with the cross-sectional area of the cap 7 approximating that of the compressed air line 2. Numeral 8 is an opening in the shape of a cylindrical ring which is positioned approximating the second half of the return path of travel of the valve cap 7 and through which, when an appropriate return of the valve cap 7 occurs, compressed air can flow unhindered to a tool (not illustrated) to which the lubricating device is fastened by nipple joint 16.

The valve shaft cylinder 4 in which the moving hollow valve shaft 5 (fitted with a spring 18) moves, has a check or non-return valve 9 facing the compressed air outflow which makes it possible to shift the shaft 5 to the left (as shown in the drawing) and the return of which is assisted due to the bias effect of spring 18. The parts which are located or seated in the cylindrical sleeve 21 constitute a retarding device which, as a whole, is designated with number 23.

The spring pressure exerted on the valve carrier 3 is adjusted so that the pressure which exists in the oil pressure chamber 11 cannot escape through the oil discharge opening 1 when a sudden or a slow reduction in pressure occurs in the compressed air chamber. Compressed air is supplied by way of a hose (not shown) which is connected to nipple joint 14, and enters the device in the direction of the arrow. Compressed air after passing through an air filter 15 flows around the centrally located valve assembly unit 19 to the valve cap 7 in the rearward portion of the compressed air line 2 and from there through to the tool.

The oil pressure chamber 11 is formed by means of a housing 20 enclosing the walls of the compressed air chamber 2. The housing 20 may be provided with a transparent visual inspection part in the form of a ring 13 in known manner. Oil is filled into the oil pressure chamber 11 through an opening which can be closed by means of an air-tight threaded plug 12. When there is sufficient pressure differential, the oil, after passing through a filter 17, flows from the oil pressure chamber 11 to the oil outflow opening 1 where it is atomized into a mist by the compressed air and is delivered to the tool through nipple 16.

When compressed air is introduced, the valve cap 7 is moved against the action of spring 18 and the drilled hole 1 to the oil pressure chamber 11 opens, with the result that the pressure of the compressed air line 2 is also imparted to the oil pressure chamber 11. At the same time the air pressure in the compressed air line 2 becomes reduced because of the outward flow of air. The pressure which now prevails in the oil pressure chamber 11 therefor equates with the reduced pressure in the air channel. As soon as the outward air flow ceases (as when the tool is not being actuated) the pressure in the compressed air line 2 increases beyond its original pressure because of the follow-up inflow of air from the air tank or air generator (not shown). In order that the increased air pressure can be transmitted to the oil pressure chamber 11 the return action of the valve cap 7, which begins immediately following cessation of outward air flow, is retarded by means of the retarding device 23. By this means the pressure increase in the compressed air chamber 2 can be transmitted to the oil pressure chamber 11 up until the time that the valve cone 6 closes. When tool operation next occurs the pressure in the compressed air line 2 is again reduced by a specific degree with the result that the pressure in the oil pressure chamber 11 is greater than the pressure in the compressed air line 2.

At the same time the valve cone 6 is again opened (due to the pressure differential between the oil pressure chamber and the air pressure chamber) and oil is forced out through the valve opening 1 so long as the pressure differential exists between the compressed air line 2 and the oil pressure chamber 11. The increase in pressure in the compressed air chamber which then follows once again stops the oil flow as soon as pressure is once more built up in the oil chamber. The further increase in pressure in the air chamber 2 produces a renewed build-up of sufficient pressure in the oil pressure chamber so that when tool operation next ceases, oil flows through the valve orifice 1.

The valve cap 7 does not completely close off the compressed air chamber 2 in order that equal pressure will prevail on both sides of the valve cap 7 when the machine is at rest and so that minor pressure differentials have no effect on the valve cap 7 and on the valve cone 6. The material from which the valve cap 7 is made is chosen, and the cap is supported on a collar 24 of the valve carrier 3, so that the cap acts like a plunger when it is contacted by the compressed air flowing toward the tool. In the reverse direction the valve cap 7 is deformed more or less into the shape of a cone or funnel allowing the compressed air which flows back from the tool to pass substantially unhindered because the cover plate 25 for the valve cap is substantially smaller than the collar 24. This arrangement is necessary in order to quickly reduce pressure differential in the toll when the compressed air line is detached. If this were not so the lubricating device would act as a check or non-return valve and it would be possible to operate the tool even though the air feed line was disconnected and this would result in increased danger of accident.

Although not illustrated a suitable design variation in the structure of the components 4 and 5, is the provision of a spiral or helical groove in the inner surface of the cylinder 4 to receive a corresponding cam provided on the outer surface of the shaft 5. With such an arrangement, longitudinal movement of the shaft 5 will result in a corresponding rotational movement.

I claim:

1. A lubricating device for pneumatic tools, particularly pulsating pneumatic tools such as pneumatic nail drivers, for installation in a compressed air pressure conduit between the tool and a source of air pressure, the device comprising an oil pressure chamber surrounding an air pressure chamber through which latter chamber air under pressure is adapted to pass, and a valve chamber positioned in and partially intersecting the air pressure chamber, and a valve assembly positioned coaxially in the air pressure chamber and operable in association with the valve chamber as a result of air pressure, and an orifice in the valve chamber communicating the air pressure chamber and the oil pressure chamber, and a valve cone carried by the valve assembly to open and close the orifice, the valve cone being closed in the orifice when the tool is not being operated, the valve assembly including a valve cap substantially closing a reduced cylindrical portion of the air pressure chamber when the tool is not being operated, with the valve assembly and valve cap opening to permit air flow when the tool is operated, the valve assembly being provided with means to retard movement of the valve assembly to a closed position after cessation of air flow to the tool.

2. A device according to claim 1 wherein the valve assembly includes a hollow shaft carrying the valve cap and valve cone, the valve cap being longitudinally movable within a valve cylinder with the valve cylinder having openings communicating with the air pressure chamber with the openings being uncovered during the course of travel of the valve cap.

3. A device according to claim 2 wherein the hollow shaft is movable coaxially and longitudinally within one end of a valve shaft cylinder, the other end of the valve shaft cylinder being provided with a spring-loaded check valve opening into the air pressure chamber.

4. A device according to claim 3 wherein the said one end of the valve shaft cylinder is provided as a stop to limit movement of the valve cap.

5. A device according to claim 1 wherein the valve cone engages within a conical portion provided in the orifice.

6. A device according to claim 1 wherein the valve cap is made of flexible material.

7. A device according to claim 3 wherein the valve shaft cylinder is provided with a spiral or helical groove to receive a cam carried by the hollow shaft whereby rotational movement is imparted to the hollow shaft during longitudinal movement thereof.

* * * * *